Jan. 9, 1962     R. P. CLAGETT     3,015,952
TESTING DEVICE FOR WIRE-WRAPPED TERMINAL CONNECTIONS
Filed Oct. 24, 1958

INVENTOR.
R. P. CLAGETT
BY
H. J. Winegar
ATTORNEY

United States Patent Office 3,015,952
Patented Jan. 9, 1962

3,015,952
TESTING DEVICE FOR WIRE-WRAPPED TERMINAL CONNECTIONS
Robert P. Clagett, Yardley, Pa., assignor to Western Electric Company, Incorporated, New York, N.Y., a corporation of New York
Filed Oct. 24, 1958, Ser. No. 769,371
1 Claim. (Cl. 73—141)

The present invention relates to wire wrap testing devices, and more particularly although not exclusively to gage devices for testing the strength of electrical connections formed by wrapping conductors spirally around terminals.

With the development of mass production and high speed manufacturing and installation techniques, many electrical connections are formed by wrapping an insulated or uninsulated conductor spirally about an electrical terminal to prevent the necessity of providing costly welding, brazing or soldering equipment and processes. It is essential that such connections be wrapped tightly enough to prevent the spirally wrapped conductor from becoming loose on the terminal or being removed unintentionally therefrom. However, care must also be taken to insure that the conductor is not wrapped on the terminal so tightly that the conductor may be broken or weakened excessively.

An object of the present invention is to provide a device for determining the force required to slide spirally wrapped wires axially off terminals about which they are wrapped.

A further object of this invention is to provide new and improved wire wrap testing devices.

Another object of the present invention is to provide a device for measuring and indicating or recording the maximum force required to move a spirally wrapped wire longitudinally of a terminal about which it is wrapped.

A further object of the present invention is to provide a device for determining if a connection formed by wrapping a wire spirally on a terminal will withstand a predetermined force being applied axially of the terminal without becoming loose or sliding therefrom.

Another object of the present invention is to provide compact devices which can be utilized in congested areas or areas of limited accessibility.

In attaining these and other objects, a device for testing the strength of wire wrapped connections on a terminal assembly embodying certain objects and features of the present invention may include a force measuring gage, a bifurcated foot for straddling the terminal between the wrapped wire of the connection and a base portion of the terminal assembly with the furcations thereof spaced closer than the outside dimensions of the wrapped wire. A member extending adjacent to the bifurcated foot and the terminal is secured slidably to the gage so that relative movement between the bifurcated foot and the gage longitudinally of the terminal will cause the gage to indicate the force required to cause such movement. Means are provided for urging relative movement between the member and the bifurcated foot for causing the bifurcated foot to apply force to the wrapped wire longitudinally of the terminal in one direction and the member to app'y a reactive force to the base portion in the opposite direction whereby the maximum or instantaneous value of the force utilized will be indicated on the gage.

Other objects and fea'ures of the present invention will be more readily understood from the following detailed description of a specific embodiment thereof when read in conjunction with the accompanying drawings, in which.

Figure 1:
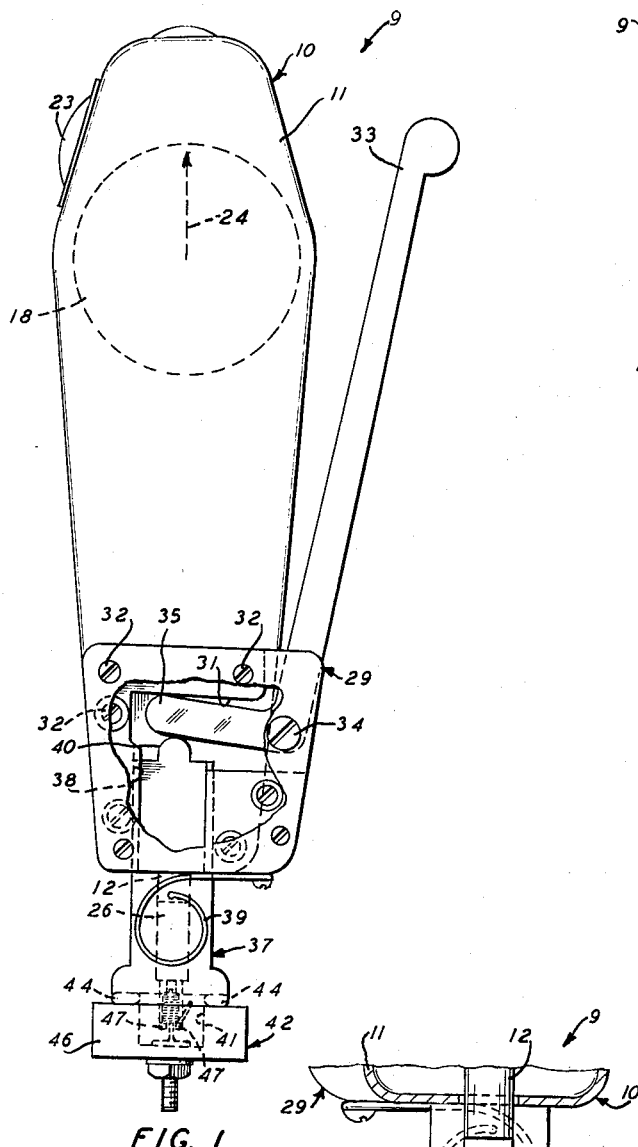
FIG. 1 is a rear elevational view of a device, with parts broken away for clarity, for testing the strength of wrapped wire connections illustrating the device in place on a terminal strip assembly.
Figure 3:
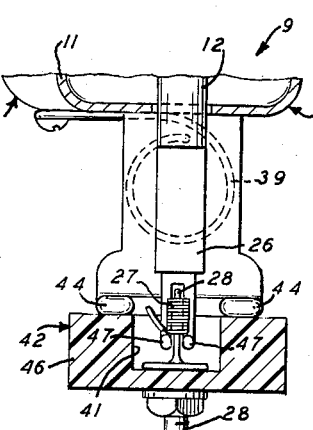
FIG. 3 is an enlarged, fragmentary, sectional view of the apparatus of FIG. 2 taken along line 3—3 thereof.

Referring now to the drawings, there is shown a testing device, designated generally by the numeral 9, which includes a conventional zero-setting, dial-indicator, force-measuring gage, designated generally by the numeral 10, such as the Series 30-M obtainable from the Hunter Spring Company, Lansdale, Pa., or such as those disclosed in P. C. Clarke Patent 2,612,042. The gage 10 includes a housing 11 through which extends a rod 12 supported at both ends for reciprocating movement. The rod 12, having a threaded end 13 thereon, passes through apertures in bearing plates 14 and 16, which are secured at opposite ends of the housing 11.

A dial indicator 17 is secured to the housing 11, and may be of any well known type but is preferably of the type having a movable face 18 for zero setting. The dial indicator 17 is provided with a movable dial actuator member 20 which maintains contact with a collar 19. The collar 19 is secured adjustably to the rod 12 and is engaged by a main, helical, compression-type spring 21 which in turn is held between the collar and the plate 16.

A preloading, tension-type spring 22 is connected adjustably between the collar 19 and plate 16 to provide a preloading compressive force on the main spring 21 to give greater accuracy to the device by compressing the spring 21 to a point where any applied force is directly proportional to the distance the ends of the main spring 21 are moved with respect to each other.

It is obvious that a spring, which has this characteristic, could be utilized as a main spring 21 and eliminate the necessity for the preloading spring 22. Means, well known in the art, are provided so that when a button 23 is depressed an indicator hand 24 in the dial indicator 17 registering the force applied to the rod 12 will remain at its maximum reading until the button 23 is released. This enables an operator to determine the pressure applied to the rod 12 at any one instance or the maximum pressure applied for any one operation.

A bifurcated, dial-actuating foot 26 is secured to the threaded portion 13 of the rod 12. The foot 26 is utilized to engage the underside of a spirally wrapped wire 27 on a terminal post 28. The furcation of the bifurcated foot 26 must be spaced sufficiently far apart to straddle the terminal post 28, but closer than the outside dimension of the wrapped wire 27.

A member 29, having an L-shaped slot 31 therein, is secured to the side of the housing 11 by appropriate means such as screws 32—32. An L-shaped lever 33 is mounted in the member 29 by a screw 34 forming a pivot. A bifurcatd member, designated generally by the numeral 37, is positioned slidably in a slot 38 in the member 29, which communicates with the slot 31. The bifurcated member 37 has an upper cam portion 40 adjacent the end thereof which slidably engages a portion of the leg 35 of the L-shaped lever 33.

Figure 2:
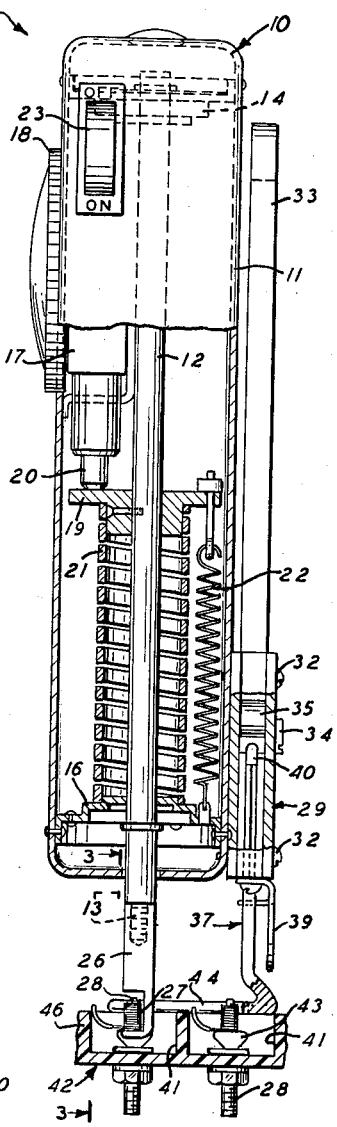
FIG. 2 is a side elevational view of the device of FIG. 1, with portions thereof broken away for purposes of clarity.

The bifurcated member 37 is preferably of such a length that it will straddle more than one of the terminal posts 28—28, as is illustrated on FIG. 2. A spring 39 is secured at one end to the member 29 and at the other end to the bifurcated member 37. The spring 39 is u-ed to urge the member 37 in an upward position so that it will straddle the bifurcated dial actuator foot 26 in preparation for the insertion of the foot 26 into a recess 41 in a terminal strip assembly, designated generally by the numeral 42. When the bifurcated foot 26 is inserted in the recess 41 it is placed astraddle one of the terminals 28—28 positioned in the recess 41 having one of the spirally wrapped wires 27—27 near to the base portion 43 thereof. In this manner, the spring 39 will cause movement of furcations 44—44 of the bifurcated member 37 to a position above the foot 26 as illustrated in the drawings, which will permit the insertion of the foot 26 around terminals 28—28 below the portion of the terminal strip assembly 42 against which the member 37 must rest. The foot 26 may also be positioned around a terminal (not shown) and below a wrapped wire (not shown) which is above the portion of a terminal block (not shown) against which the member 37 will rest.

*Operation*

Assuming that it is desirable to test a connection formed by the wrapped wire 27 and the terminal 28, the bifurcated foot 26 will be placed in the recess 41 under the wrapped wire 27 and astraddle the terminal post 28 onto which the wire 27 is wrapped. The bifurcated member 37 will be astraddle the bifurcated foot 26 and one or more terminals 28—28 and may or may not be resting on a block 46 of the terminal strip assembly 42.

With the device 9 in above-described position, the lever 33 will be urged to pivot about the pivot point 34 so that the upper end thereon as illustrated in FIG. 1 moves in a direction toward the housing 11. This will result in the leg 35 of the lever 33 applying camming force to the cam portion 40 of the bifurcated member 37 which will in turn result in the bifurcated foot 26, the housing 11 and the dial indicator 17 all moving with respect to the bifurcated member 37 until the top surfaces of furcations 47—47 of the bifurcated foot are against the lower surface of spirally wrapped wire 27 and the lower surface of the bifurcated member 37 rests on the top of the block 46. With further application of force on the lever 33, the housing 11 and the dial indicator 17 are moved upwardly with respect to the bifurcated foot 26 and bifurcated member 37, both of which are stationary, thus causing the main spring 21 to be compressed and the force stretching the compensating spring 22 to be relaxed.

The force applied in an attempt to move the bifurcated foot 26 and member 37 further apart and thus the spirally wrapped wire 27 longitudinally of the terminal post 28 is indicated by the indicator hand 24 of dial indicator 17. If the button 23 is depressed the hand 24 will indicate the maximum force applied to the wrapped wire 27 by the foot 26.

The force applied to the lever 33 may be increased until the wire-wrapped connection has withstood a predetermined maximum force, or until sufficient force is applied to cause the spirally wrapped wire 27 to slide along the terminal post 28 and thus cause the wire-wrapped connection to fail. In either event, the maximum force applied to the wrapped wire by the foot 26 will be indicated by the hand 24 on the dial indicator 17, if the button 23 is depressed. Otherwise, if the button 23 is not depressed, the hand 24 of the dial indicator 17 will indicate the force being applied at that instant.

It is to be understood that the above-described arrangements are simply illustrative of the invention. Other arrangements may be devised by those skilled in the art which will embody the principles of the invention and fall within the spirit and scope thereof.

What is claimed is:

A device for testing the strength of a wrapped terminal connection formed between a terminal post seminal secured in a recess in a base member and a wire wrapped spirally on the terminal post, which comprises a dial-indicator, force-measuring gage, a housing forming a portion of the gage, a dial-actuating rod connected operatively to the gage and extending through the housing of the gage, a bifurcated, dial-actuating foot secured adjacent to a free end of the rod, straddling a terminal post of the connection being tested and underlying a wire wrapped spirally on the terminal post, the terminal post being positioned in a recess in a base member which projects above the lower portion of the wrapped wire of the connection being tested, a slotted member secured to the housing, a substantially L-shaped lever secured pivotably to the housing in a slot in the member with the leg of the L-shaped lever extending substantially transversely of the dial-actuating rod, a bifurcated member straddling the terminal being tested and the bifurcated dial-actuating foot to permit the bifurcated member to be reciprocated past the bifurcated foot in either direction, the bifurcated member being secured slidably to the housing in a slot in the slotted member, the bifurcated member contacting the upper surface of the portion of the base projecting above the lower portion of the wrapped wire of the connection being tested, the bifurcated member having an upper cam portion on the end thereof slidably engaging a portion of the leg of the L-shaped lever, resilient means secured between the slotted member and the bifurcated member for holding the cam portion of the bifurcated member in engagement with the leg of the L-shaped lever for urging the furcated portion of the bifurcated member toward the housing and for normally holding the furcated portion of the bifurcated member in an unoperated position between the dial-actuating foot and the housing to permit the device to be utilized for checking such wrapped terminal connections when the base member onto which the terminal is secured projects above the lower portion of the wrapped wire portion of the connection, and means for causing the indicator of the gage to remain in a position indicating the maximum force applied to the gage, the lever being utilized for sliding the bifurcated member axially of the terminal post in the slotted member away from the gage in the housing resulting in opposed forces being exerted on the under side of the wrapped wire and the adjacent upper surface of the base member by the bifurcated foot and bifurcated member, respectively, so as to produce a stripping action, the gage indicating the maximum stripping force applied to the spirally wrapped wire of the connection being tested during the stripping action.

References Cited in the file of this patent

UNITED STATES PATENTS

| | | |
|---|---|---|
| 2,612,042 | Clarke | Sept. 30, 1952 |
| 2,759,357 | Bos et al. | Aug. 21, 1956 |
| 2,782,635 | Knight | Feb. 26, 1957 |